United States Patent

Neglia et al.

[11] Patent Number: 5,128,883
[45] Date of Patent: Jul. 7, 1992

[54] METHOD FOR ABSOLUTE POSITION DETERMINATION OF MULTI-SPEED DEVICES

[75] Inventors: Joseph D. Neglia, Phoenix; David C. Cunningham, Carefree, both of Ariz.

[73] Assignee: Honeywell Inc., Minneapolis, Minn.

[21] Appl. No.: 691,184

[22] Filed: Apr. 25, 1991

Related U.S. Application Data

[63] Continuation of Ser. No. 481,021, Feb. 16, 1991, abandoned.

[51] Int. Cl.$^5$ ............................................. G05B 23/02
[52] U.S. Cl. ..................................... 364/550; 364/560; 318/565
[58] Field of Search .............. 364/550, 551.01, 551.02, 364/560, 581, 565; 318/565, 568.17, 571, 572, 652, 683, 67, 69, 71

[56] References Cited

U.S. PATENT DOCUMENTS

| | | | |
|---|---|---|---|
| 3,551,656 | 12/1970 | Wohlfeil | 318/660 X |
| 4,390,865 | 6/1983 | Lauro | 318/660 X |
| 4,449,191 | 5/1984 | Mehnert | 33/1 PT X |
| 4,766,359 | 8/1988 | Smith et al. | 318/652 |
| 4,799,178 | 1/1989 | Spadafora et al. | 364/565 |
| 4,831,315 | 5/1989 | Hammond et al. | 318/572 X |
| 4,956,796 | 9/1990 | Rogers et al. | 364/581 |
| 4,977,525 | 12/1990 | Blackwell | 364/565 |
| 4,991,125 | 2/1991 | Ichikawa | 364/560 |
| 4,994,991 | 2/1991 | Richman | 364/581 |
| 5,019,773 | 5/1991 | Sugiura et al. | 364/565 |

*Primary Examiner*—Joseph L. Dixon
*Attorney, Agent, or Firm*—A. A. Sapelli; D. Lenkszus; W. Udseth

[57] ABSTRACT

In a system for controlling or monitoring an object, wherein a position of the object must be determined, the system includes a first and second multispeed sensor, the first sensor having a speed of N and the second sensor having a speed of N−1. A method for determining the position of the object comprises the steps of obtaining position data as measured by the first and second multispeed sensor, respectively. A parameter, $N_A$, a weighted difference between the obtained position data, is determined to ascertain whether a first or second case exists. If the first case exists, a first set of constants based on a first set of equations is generated; otherwise the first set of constants is generated based on a second set of equations. A second set of constants is then generated. Finally, the position of the object is determined by calculating the weighted average of the second constants, thereby obtaining the position of the object, utilizing the data provided by both sensors.

7 Claims, 3 Drawing Sheets

METHOD FOR ABSOLUTE POSITION DETERMINATION OF MULTI-SPEED DEVICES

This is a continuation of copending application Ser. No. 07/481,021 filed on Feb. 16, 1991, now abandoned.

This invention relates to the processing of sensor information, and more particularly, to a method of determining unique, absolute position from multi-speed sensors.

Sensors, which include Inductosyns, (both linear and rotational), resolvers, and synchros, have been used to sense and determine an angular or linear position of a shaft or gimbal. In order to increase the accuracies obtainable, multi-speed devices were developed. In rotational devices, for example, the output of these multi-speed devices go through several cycles for each full mechanical rotation of the shaft. However, the sensor output is no longer a unique absolute indication of the mechanical position of the shaft being measured; rather, one reading can represent several possible mechanical positions. One technique employed to determine the angular position using multi-speed devices, is "turns counting". This technique simply counts the number of full electrical cycles the resolver output goes through in order to yield a coarse estimate of shaft position, and this integer is then added to the remaining fractional output of the resolver. The result is an accurate measurement of absolute angular position. However, because memory of the number of cycles traversed is required, momentary power glitches or electrical upsets or noise of any sort can cause the device to lose track of its current position. Once this occurs there is no way for a controller to recalculate the current position. The only alternative is to slew the entire shaft or gimbal back to some reference point and then begin moving the shaft back to the desired position counting cycles as the shaft moves toward the desired position. For many applications this technique is clearly unacceptable.

Techniques used in order to achieve a desired accuracy and yield unambiguous position measurements utilize a single-speed device along with a multi-speed device. The single-speed device provides a coarse position estimate. This coarse position estimate is then combined with the accurate but ambiguous multi-speed measurement in order to yield a measurement which is both accurate and unique. This solution is practical where moderate accuracy is acceptable. For relatively extremely precise accuracy, the multi-speed sensor must typically be a 100-speed device or greater. In such case, the single-speed device must be precise enough to reliably and uniquely determine each of the 100 or more segments of the multi-speed device. This implies that a minimum accuracy of one-percent is needed and a factor of five or ten over this accuracy would probably be required in any real application. Thus, the accuracy required for the single-speed device generally exceeds the capability of most single-speed devices currently available.

Another technique used involves the use of three sensors: a coarse sensor, a medium sensor, and a fine sensor. The coarse sensor resolves the measured interval into the medium sensor and the medium sensor resolves these measurements into the fine sensor. This technique can yield very high accuracies, its disadvantage being the complexity and cost factor associated with this configuration.

Still another technique involves the use of two multi-speed sensors to calculate the coarse positions. If, for example a 128-speed and a 127-speed device were utilized (i.e., a N/N−1 device combination), there will always be a unique mapping from the two sensor readings to the absolute mechanical position. This approach has the additional advantage that two high precision readings are now available. These can be combined to yield a single reading with lower quantization and jitter effects. Also, this system is simpler from an implementation standpoint since both channels (i.e., each multi-speed sensor path) can be very similar, if not identical, in construction. The combination of the generated single-speed reading and multi-speed reading can be performed by a technique known as "BLU's algorithm" or by a technique described by Farrand, well known to those skilled in the art. The combination generated by these techniques essentially ignores one of the multi-speed sensor readings in generating the final measurement, thereby causing errors to propagate directly from one channel to the output.

Thus, there is a need to provide a technique which achieves the desired accuracies, utilizing small, inexpensive and rugged sensors which are currently available and arranged in a simple configuration. The present invention utilizes two multi-speed sensors and converts the data from these two multi-speed sensors into an absolute mechanical position (i.e., angle) indication by utilizing an algorithm which uses a weighted difference and a weighted average of the two multi-speed sensor outputs. Thus, the technique of the present invention uses all the available sensor information in order to determine the actual position. This yields a measurement having higher accuracy than currently attainable under the existing techniques identified above.

SUMMARY OF THE INVENTION

Therefore, there is provided by the present invention, a method of determining unique, absolute position from multi-speed sensors. In a system for controlling or monitoring an object, wherein a position of the object must be determined, the system includes a first and second multispeed sensor, the first sensor having a speed of N and the second sensor having a speed of N−1. A method for determining the position of the object comprises the steps of obtaining position data as measured by the first and second multispeed sensor, respectively. A parameter, $N_A$, a weighted difference between the obtained position data, is determined to ascertain whether a first or second case exists. If the first case exists, a first set of constants based on a first set of equations is generated; otherwise, the first set of constants is generated based on a second set of equations. A second set of constants is then generated. Finally, the position of the object is determined by calculating the weighted average of the second constants, thereby obtaining the position of the object, utilizing the data provided by both sensors.

Accordingly, it is an object of the present invention to provide a method for determining the position of an object.

It is still another object of the present invention to provide a method for determining the angular position of a shaft.

It is yet another object of the present invention to provide a method for determining the linear position of an object.

It is another object of the present invention to provide a method for determining a unique, absolute angular position of a shaft from multi-speed angular sensors.

These and other objects of the present invention will become more apparent when taken in conjunction with the following description and attached drawings, wherein like characters indicate like parts, and which drawings form a part of the present application.

DETAILED DESCRIPTION

Figure 1:
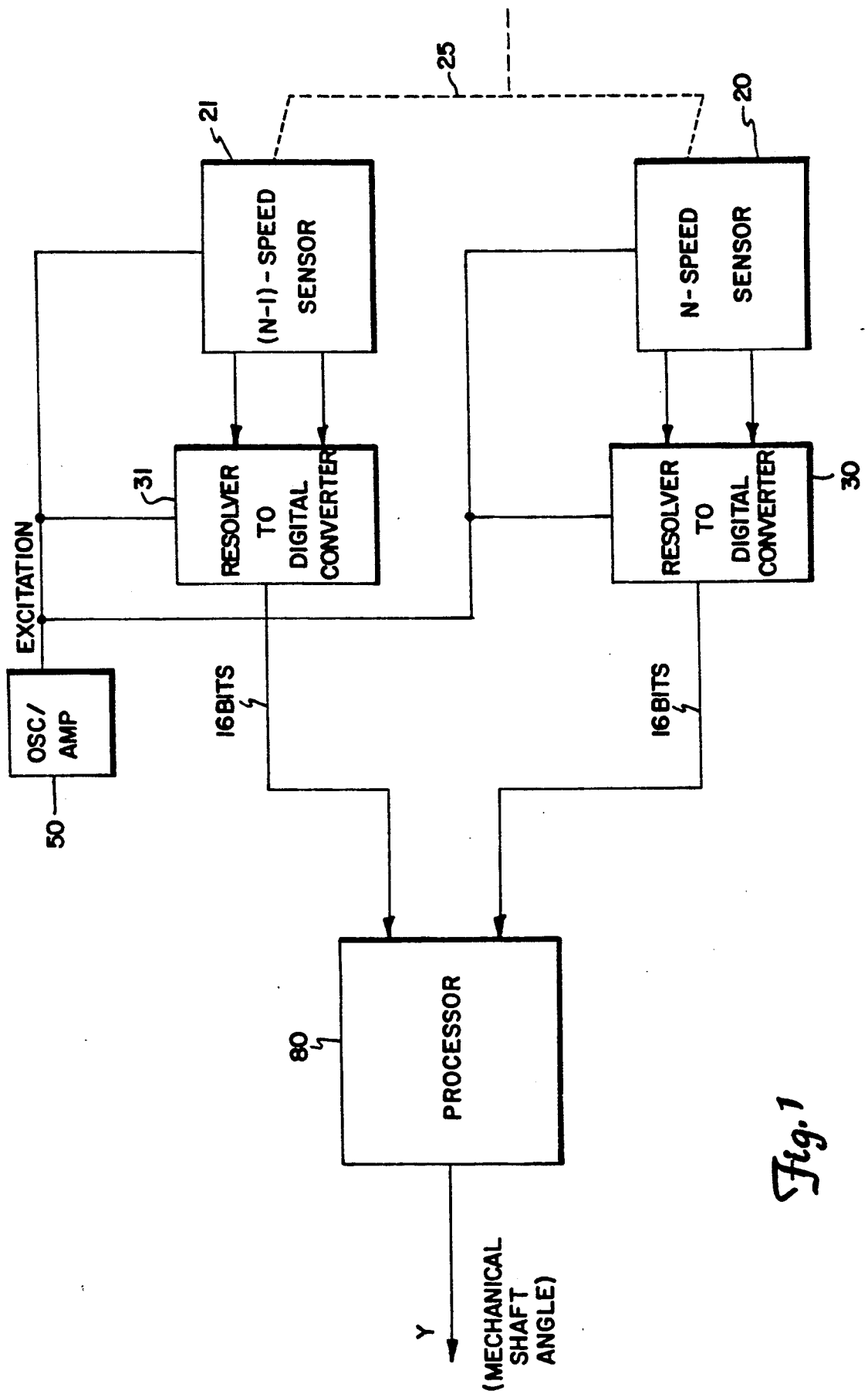
FIG. 1 shows a block diagram of a typical angular measurement system which utilizes the method of the present invention.

Referring to FIG. 1, there is shown a block diagram of a typical angular measurement system which utilizes the method of the present invention. (Although angular positioning is shown in the preferred embodiment, it will be understood by those skilled in the art that the present invention is equally applicable to linear sensors, such as linear Inductosyns, and is intended to be within the scope of the present invention.) The preferred embodiment of the present invention utilizes two multi-speed sensors 20, 21, a first sensor 20 having a speed N and a second sensor 21 having a speed N−1 (both sensors 20, 21 being a fine or high speed dual sensor). Both sensors 20, 21 are coupled to a shaft (not shown) as depicted by dotted line 25. The outputs of the sensors 20, 21 are coupled to respective resolver to digital converters (RDC) 30, 31. The RDC 30, 31 converts the output of the respective sensor 20, 21 to a binary digital word, the binary data having a magnitude proportional to the electrical angle sensed by the sensor. As is understood by those in the art, the digital output of the respective RDC 30, 31 will repeat a number of times (the number being equal to the speed) for a single revolution of the shaft (not shown). Each sensor 20, 21 and each RDC 30, 31 is provided with the excitation required for the proper operation of the devices. The output of each RDC 30, 31 is coupled to a processor 80 which processes the digital word from each RDC to generate an unambiguous highly precise value of the mechanical shaft angle Y from the two ambiguous values outputted from the RDC 30, 31 in accordance with the method of the present invention which will be described hereinunder.

Although the sensors are shown as two separate sensor devices, it will be understood by those skilled in the art that various configurations of the sensors can be utilized. In the preferred embodiment of the present invention the N/N−1 sensors 20, 21 are 128/127 speed dual Inductosyn, manufactured by Farrand Industries, Inc., Valhalla, N.Y., using Farrand Part No. 218949-1. Although not shown, the outputs of the Inductosyns of the preferred embodiment of the present invention are coupled to Inductosyn preamplifiers, using two type IPA-15805. The RDC converters utilized in the preferred embodiment of the present invention are manufactured by Analog Devices, Part Number 2S80JD. The excitation in the preferred embodiment of the present invention is provided by a oscillator/amplifier device available from Analog Devices, Part No. OSC-1758. The output of each of the RDC 30, 31 in the preferred embodiment of the present invention is a 16-bit digital word normalized to a value between 0 and 1, the value cycling between these values 127 or 128 times (for n−1 speed sensor 21 or n speed sensor 20, respectively) for a 360° rotation of the shaft. The processor 80 can be any processor well known in the art which satisfies performance requirements of the system.

The method of the present invention will now be described by its derivation.

In an N/N−1 speed sensor system as described above, the following data are known:

N = the "speed" of first sensor, denoted as sensor A or by the subscript A.

N−1 = the "speed" of second sensor, denoted as sensor B or by the subscript B.

$Y_N$ = the angle measured by first sensor A. $Y_{N-1}$ = the angle measured by second sensor B.

(Both $Y_N$ and $Y_{N-1}$ are normalized digital data in units of "revolutions".)

The method of the present invention calculates the mechanical shaft angle Y, using only the above, known, data.

It is helpful to define the following variables:

$N_A$ = the number of full electrical cycles passed on sensor A.

$N_B$ = the number of full electrical cycles passed on sensor B.

$C_N$ = the total electrical angle traversed by sensor A.

$C_{N-1}$ = the total electrical angle traversed by sensor B.

From these definitions, it follows that $$C_N = N_A + Y_N$$

$$C_{N-1} = N_B + Y_{N-1}.$$

The best estimate of the true angle is a weighted average of these two measurements:

$$Y = \frac{1}{2}\left[\frac{C_N}{N} + \frac{C_{N-1}}{N-1}\right]$$

Manipulating this into a somewhat simpler form, $$Y = \frac{(N-1)C_N + NC_{N-1}}{2N(N-1)}. \tag{1}$$

In order to obtain Y from the above relation, $C_N$ and $C_{N-1}$ must be known. In order to obtain these, however $N_A$ and $N_B$ must first be found. They can be calculated by using the fact that the sensors have the ratio of N:N−1. Therefore, $$\frac{C_N}{N} = \frac{C_{N-1}}{N-1}$$

$$NC_{N-1} = (N-1)C_N$$

Using the definition of $C_N$ and $C_{N-1}$ above yields $$N(N_B + Y_{N-1}) = (N-1)(N_A + Y_N).$$

From this relation we need to find $N_A$ and $N_B$. Recognizing that since the sensors differ by one speed over the entire 360 degrees of revolution, either $$N_A = N_B \quad \text{(case 1)}$$

or $$N_A = N_B + 1. \quad \text{(case 2)}$$

Taking advantage of this fact allows us to calculate two versions of $N_A$:

Case 1:

(where $N_A = N_B$:)

$$NN_A + NY_{N-1} = NN_A + NY_N - N_A - Y_N$$

$$N_A(\text{case 1}) = (N-1)Y_N - NY_{N-1}. \quad (2)$$

Case 2:

(where $N_A = N_B + 1$:) $\quad (5)$ $$N(N_A - 1 + Y_{N-1}) = (N-1)(N_A + Y_N)$$

$$N_A(\text{case 2}) = (N-1)Y_N - NY_{N-1} + N.$$

(Note that $N_{A\ (case\ 2)} = N_{A\ (case\ 1)} + N$.) $\quad (4)$

Only one of the above two cases will be correct at a given angle. The correct case will yield a reasonable value for $N_A$. Reasonable values for $N_A$ (by the definition of the variable) fall in the range $$0 \leq N_A \leq N. \quad (3)$$

The incorrect $N_A$ will fall outside this range.

Having thus calculated $N_A$ and $N_B$, $C_N$ and $C_{N-1}$ can be calculated. The actual mechanical shaft angle Y can now be calculated from the above equation (1), for control of the shaft in gyro, platform, telemetry, . . . applications.

Figure 2:
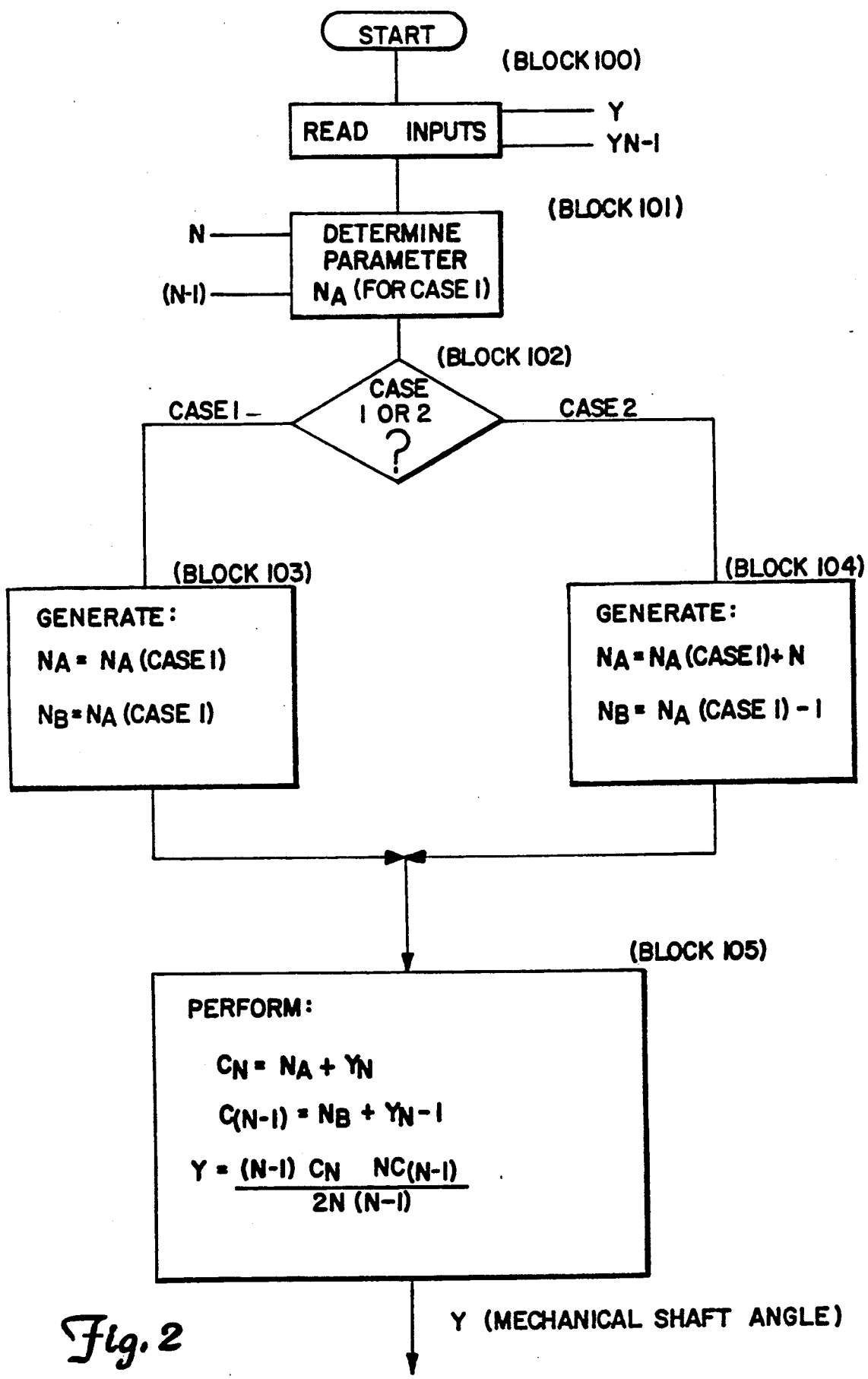
FIG. 2 shows a flow diagram of the method of the preferred embodiment of the present invention.

Referring to FIG. 2, there is shown a flow diagram of the method of the preferred embodiment of the present invention. The first step of the method is to obtain the value of data $_N$ and data $_{N-1}$ (block 100), as provided by RDC 30, 31 in the system of FIG. 1. Data $Y_N$ is the angle measured by the first sensor 20 (sensor A), and $Y_{N-1}$ is the angle measured by the second sensor 21 (sensor B). Both $Y_N$ and $Y_{N-1}$ are normalized digital data in units of revolutions, the digital value varying between 0 and 1. Using the data read from RDC 30, 31, the parameter $N_A$ (case 1) is determined, utilizing the data plus the values of N and N−1 which are known parameters of the sensors A and B (block 101). $N_A$ for case 1 is the equation shown above, equation (2). This parameter is a weighted difference between the two Y readings. It is an indication of the number of electrical cycles traversed from the origin of the sensors and, as such it represents the coarse gimbal position. The value of the parameter calculated above is utilized to determine whether the conditions of case 1 or case 2 exists (block 102). If the parameter calculated has a value between 0 and N, as shown above in equation 3, the condition exists for case 1. Otherwise, the conditions for case 2 exist. If the conditions for case 1 exist the parameters $N_A$, $N_B$ are generated (block 103). Namely, $N_A$ and $N_B$ are both made equal to the parameter calculated above, i.e. $N_A$ for case 1. If the conditions for case 2 exist the parameters $N_A$ and $N_B$ are generated based on the equations 4 and 5; namely, $N_A$ for case 2 is equal to $N_A$ for case 1 plus N, and $N_B$ for case 2 is equal to $N_A$ for case 1, minus 1. Having thus calculated $N_A$ and $N_B$, the coefficients $C_N$ and $C_{N-1}$ can be generated. Having thus calculated the necessary coefficients, the mechanical shaft angle Y can now be generated in accordance with equation 1 (block 105). The mechanical shaft angle is then outputted from the processor 80 of the system of FIG. 1 and transmitted to a controlling or displaying or recording device (not shown) for the control of a shaft coupled to a gyro, platform, telemetry equipment, . . . .

It will be recognized by those skilled in the art that the algorithm can be implemented in a variety of ways, including hard wired logic where high speed is necessary. The algorithm described above can also be implemented in software. It can also be recognized by those skilled in the art that sensor devices need not have an N/N−1 relationship, to implement the present invention and realize the accuracies afforded by the method of the present invention. It will be recognized by those skilled in the art that sensor devices can be used having an N/(N−2) relationship can be used by the method of the present invention for Y angle measurements over 180°. Devices having an N/(N−4) relationship can be used by the method of the present invention for Y angle measurements over 90°. It will also be recognized by those skilled in the art that other combinations of the servo devices can be utilized.

Figure 3:
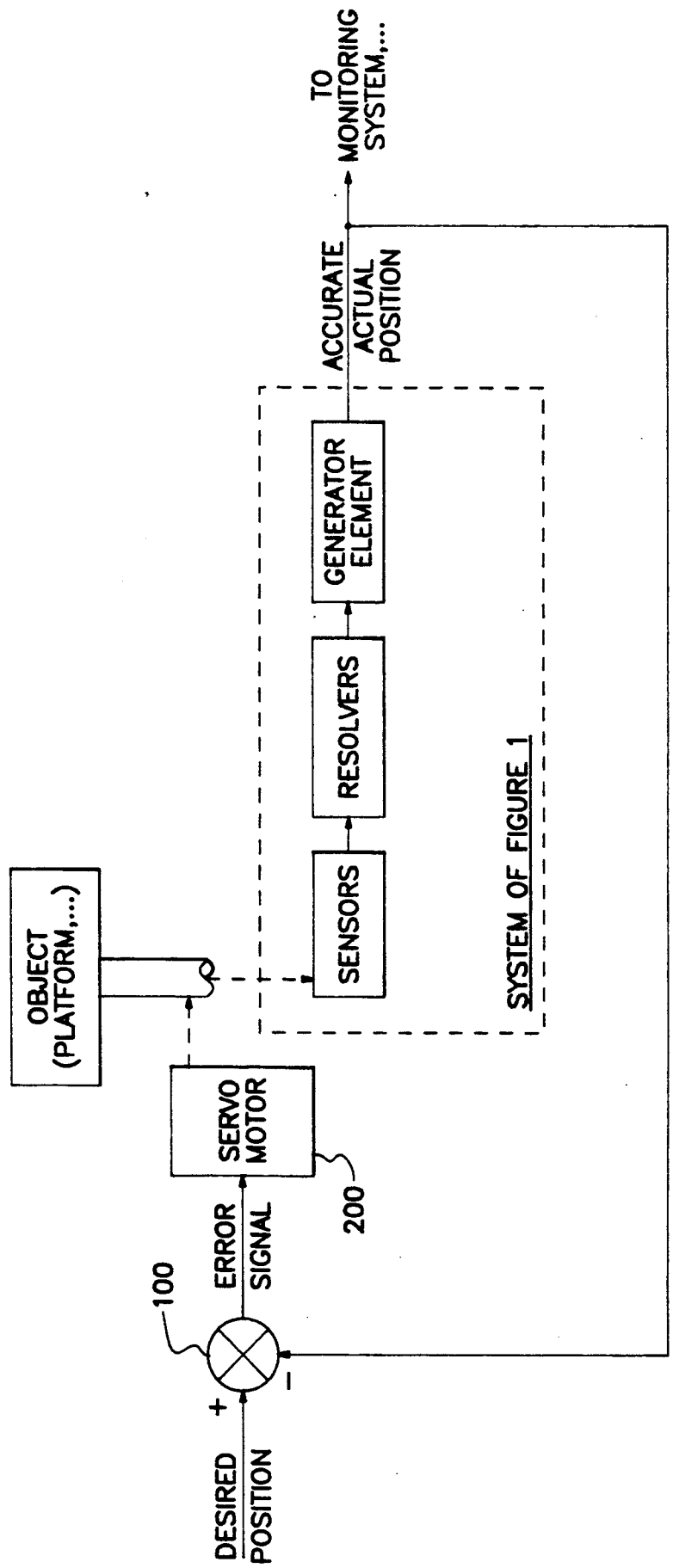
FIG. 3 shows a block diagram of a classical control loop utilizing the present invention.

Referring to FIG. 3, there is shown a block diagram of a classical control loop utilizing the present invention as described above.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a system for controlling the position of an object, the system including a difference element for obtaining a difference between a desired position of the object and an actual position of the object, the desired position and the actual position being represented by a corresponding desired position signal and a corresponding actual position signal, the difference being outputted from the difference element as an error signal, the error signal being coupled to a servo motor which is in turn coupled to the object, the servo motor causing the object to be driven to a new position in response to the error signal such that the actual position of the object is at the desired position of the object resulting in a zero error signal whereupon the object is no longer driven by the servo motor, the system further having a first and second multi-speed sensor, the first sensor having a speed of N and the second sensor having a speed of N−1, both the first and second multi-speed sensor being high speed sensors, the first multi-speed sensor outputting a first measured position of the object and the second multi-speed sensor outputting a second measured position of the object, signals $Y_1$ and $Y_2$, respectively, said $Y_1$ and $Y_2$ signals being measured position data signals, signals $Y_1$ and $Y_2$ being coupled to a generator element for generating the actual position signal of the object, said generator element comprising:

a) means for accepting the measured position data signals, $Y_1$, and $Y_2$, as measured by the first and second multi-speed sensor, respectively;

b) means for calculating a first value of a parameter $N_A$ corresponding to a first case;

c) means for calculating a second value of the parameter $N_A$ corresponding to a second case;

d) means for comparing the first value of the parameter $N_A$ and the second value of the parameter $N_A$ to a predetermined range of values to determine whether the first value of $N_A$ or the second value of $N_A$ falls within the predetermined range of values, to determine if the first case exists or if the second case exists;

e) means, responsive to said means for comparing, for generating a first set of parameters, $N_A$ and $N_B$, based on a first set of equations when said means for comparing indicates the first case exists, and based on a second set of equations when said means for comparing indicates the second case exists;

f) means for generating a second set of parameters, $C_N$ and $C_{N-1}$, utilizing said first set of parameters; and g) means for calculating the position of the object, Y, wherein all the sensor information available is utilized to provide a highly accurate measure of the actual position of the object, the actual position signal being outputted from the generator element and coupled to the difference element for generating the error signal thereby accurately controlling the position of the object.

2. In a system for controlling the position of an object, the system comprising:

a) a difference element for obtaining a difference between a desired position of the object and an actual position of the object, the desired position and the actual position being represented by a corresponding desired position signal and a corresponding actual position signal, the difference being outputted from the difference element as an error signal;

b) a servo motor, the error signal being coupled to the servo motor which is in turn coupled to the object, the servo motor causing the object to be driven to a new position in response to the error signal such that the actual position of the object is at the desired position of the object resulting in a zero error signal whereupon the object is no longer driven by the servo motor;

c) a first and second multi-speed sensor, the first sensor having a speed of N and the second sensor having a speed of N−1, both the first and second multi-speed sensor being high speed sensors, the first multi-speed sensor outputting a first measured position of the object and the second multi-speed sensor outputting a second measured position of the object, signals $Y_1$ and $Y_2$, respectively, said $Y_1$ and $Y_2$ signal being measured position data signals; and d) generator means, signals $Y_1$ and $Y_2$ being inputted to the generator means, for generating the actual position signal of the object, said generator means including:

i) means for accepting the measured position data signals, $Y_1$, and $Y_2$, as measured by the first and second multi-speed sensor, respectively;

ii) means for calculating a first value of a parameter $N_A$ corresponding to a first case;

iii) means for calculating a second value of the parameter $N_A$ corresponding to a second case;

iv) means for comparing the first value of the parameter $N_A$ and the second value of the parameter $N_A$ to a predetermined range of values to determine whether the first value of $N_A$ or the second value of $N_A$ falls within the predetermined range of values, to determine if the first case exists or if the second case exists;

v) means, responsive to said means for comparing, for generating a first set of parameters, $N_A$ and $N_B$, based on a first set of equations when said means for comparing indicates the first case exists, and based on a second set of equations when said means for comparing indicates the second case exists;

vi) means for generating a second set of parameters, $C_N$ and $C_{N-1}$, utilizing said first set of parameters; and vii) means for calculating the position of the object, Y, wherein all the sensor information available is utilized to provide a highly accurate measure of the actual position of the object, the actual position signal being outputted from the means for calculating the position of the object and coupled to the difference element for generating the error signal thereby accurately controlling the position of the object.

3. In a system for controlling the position of an object, the system including a difference element or obtaining a difference between a desired position of the object and an actual position of the object, the desired position and the actual position being represented by a corresponding desired position signal and a corresponding actual position signal, the difference being outputted from the difference element as an error signal, the error signal being coupled to a servo motor which is in turn coupled to the object, the servo motor causing the object to be driven to a new position in response to the error signal such that the actual position of the object is at the desired position of the object resulting in a zero error signal whereupon the object is no longer driven by the servo motor, the system further having a first and second multi-speed sensor, the first sensor having a speed of N and the second sensor having a speed of N−1, both the first and second multi-speed sensor being high speed sensors, the first multi-speed sensor outputting a first measured position of the object and the second multi-speed sensor outputting a second measured position of the object, signals $Y_1$ and $Y_2$, respectively, said $Y_1$ and $Y_2$ signals being measured position data signals, signals $Y_1$ and $Y_2$ being coupled to a generator element for implementing a method to generate the actual position signal of the object, said method comprising the steps of:

a) accepting the measured position data signals, $Y_1$, and $Y_2$, as measured by the first and second multi-speed sensor, respectively;

b) calculating a first value of a parameter $N_A$ corresponding to a first case;

c) calculating a second value of the parameter $N_A$ corresponding to a second case;

d) comparing the first value of the parameter $N_A$ and the second value of the parameter $N_A$ to a predetermined range of values to determine whether the first value of $N_A$ or the second value of $N_A$ falls within the predetermined range of values, to determine if the first case exists or if the second case exists;

e) generating a first set of parameters, $N_A$ and $N_B$, based on a first set of equations when the first case exists, and based on a second set of equations when the second case exists;

f) generating a second set of parameters, $C_N$ and $C_{N-1}$, utilizing said first set of parameters;

g) calculating the position of the object, Y, the method utilizing all the sensor information available to provide a highly accurate measure of the actual position of the object; and h) outputting the actual position signal from the generator element to the difference element to generate a current error signal causing the object to be repositioned such that the actual position of the object accurately follows the desired position yielding an accurately controlled position of said object.

4. A method for determining the position of an object according to claim 3, wherein the steps of calculating the first value and the second value of the parameter $N_A$ comprises the step of:

calculating a weighted difference between the position data, $Y_1$ and $Y_2$, making a first assumption for the first case and making a second assumption for the second case.

5. A method for determining the position of an object according to claim 4, wherein the step of generating a first set of parameters comprises the steps of:

a) setting the first set of parameters, $N_A$ and $N_B$, equal to the first value of the parameter $N_A$ for case 1; otherwise b) setting the first set of parameters, $N_A$ and $N_B$, to $N_A =$ the first value of the parameter $N_A + N$, and $N_B =$ the first value of the parameter $N_A + N - 1$ for Case 2.

6. A method for determining the position of an object according to claim 5, wherein the step of generating a second set of parameters comprises the steps of:

a) calculating a first of the second set of parameters, $C_N$, by adding the value of $Y_1$ to the parameter $N_A$; and b) calculating a second of the second set of parameters, $C_{N-1}$, by adding the value of $Y_2$ to the parameter $N_B$.

7. A method for determining the position of an object according the claim 6, wherein the step of calculating the position comprises the step of:

combining the second parameters, to generate a weighted average of the second parameters, thereby obtaining the position of the object.

* * * * *